C. O. GEST.
SPRING SUPPORT FOR MOTOR VEHICLES.
APPLICATION FILED APR. 9, 1917.
1,239,901. Patented Sept. 11, 1917.
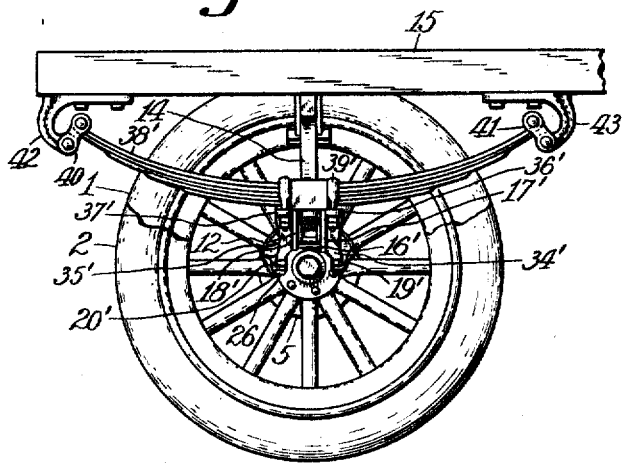
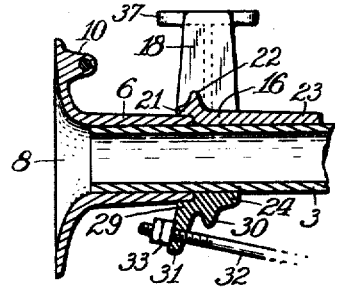
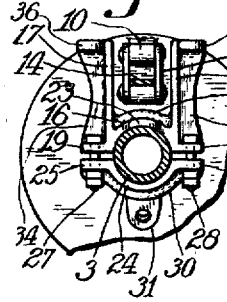
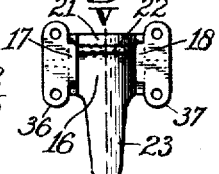
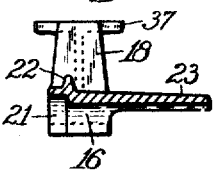
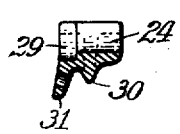
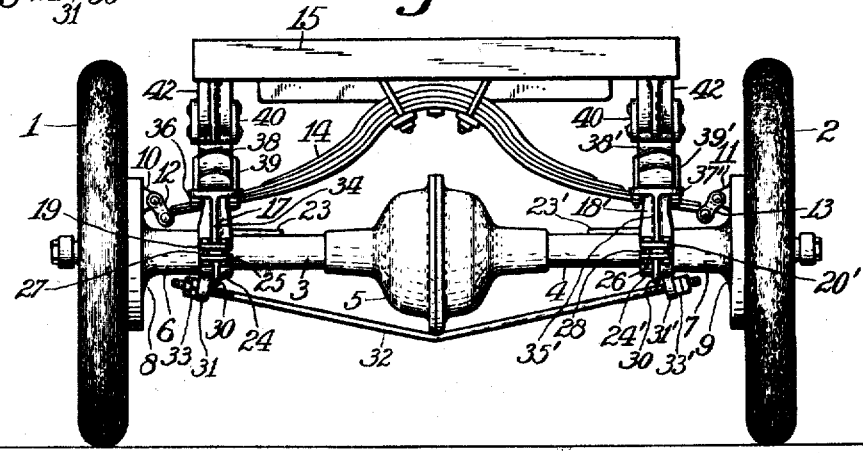
WITNESSES:
J. H. Gardner.
Myrtle McCoy
INVENTOR:
Clarence O. Gest,
BY
E. T. Silvius,
ATTORNEY.

UNITED STATES PATENT OFFICE.

CLARENCE O. GEST, OF INDIANAPOLIS, INDIANA.

SPRING-SUPPORT FOR MOTOR-VEHICLES.

1,239,901.   Specification of Letters Patent.   Patented Sept. 11, 1917.

Application filed April 9, 1917. Serial No. 160,865.

*To all whom it may concern:*

Be it known that I, CLARENCE O. GEST, a citizen of the United States, residing at Indianapolis, in the county of Marion and State of Indiana, have invented a new and useful Spring-Support for Motor-Vehicles, of which the following is a specification, reference being had to the accompanying drawings and to the letters and figures of reference marked thereon.

This invention relates to supports that are designed to be applied to axles of motor vehicles, more especially to passenger automobiles, to support additional springs when it is desired to haul an unusual load or in case it is desired to convert a passenger automobile into a freight truck, the invention having reference more particularly to a spring-support that is adapted to be secured to the inclosing casing of a rear axle as commonly constructed for passenger automobiles.

An object of the invention is to provide a simple and inexpensive spring-support of the above-mentioned character that shall be so constructed as to permit it to be readily applied to the axle casing without it being necessary to remove the automobile wheels or disconnect any of the parts of the automobile structure, when additional springs are required or desired.

With the above-mentioned and other objects in view, the invention consists in the novel construction in spring-supports and in the parts and novel combinations and arrangements of parts as hereinafter particularly described and further defined in the accompanying claims.

Referring to the drawings,—Figure 1 is a fragmentary side elevation of a motor truck equipped with the invention, the nearer one of the rear wheels being broken away to expose various elements of the improvement; Fig. 2 is a fragmentary longitudinal section of the rear axle casing having the improved spring-support applied thereto; Fig. 3 is a transverse section of the axle casing and the improved spring-support shown thereon in elevation; Fig. 4 is a top plan of the main part of the spring-support; Fig. 5 is a section on the line V—V on Fig. 4; Fig. 6 is a perspective view of one of the arms for connecting the truck frame to the truck springs; Fig. 7 is a central section of a clamp part of the spring-support; and, Fig. 8 is a rear elevation of Fig. 1 showing the pair of spring-supports required.

Similar reference characters on the different figures of the drawings indicate corresponding elements or features of construction herein referred to.

Parts of an automobile of the common type are illustrated in order to an understanding of the invention and comprise rear wheels 1 and 2, a rear axle casing comprising tubular end portions 3 and 4 and a gear casing 5, elongated collars 6 and 7 being secured to the end portions respectively and having flanges 8 and 9 thereon respectively that are arranged adjacent to the wheels or to the brake drums usually provided. The flanges have ears 10 and 11 thereon respectively which support links 12 and 13 respectively that support the single spring 14 with which the passenger automobile is commonly provided and on which the frame 15 is secured. The frame may be that of the automobile as originally constructed or may be an extension thereof more particularly adapted for serving as a part of a truck platform or body. When additional springs are required it is an important advantage to apply them without disturbing the spring 14 or interfering with its functions, more particularly to permit of ready removal of the spring-supports in case it is desired to operate the vehicle subsequently with the springs originally provided.

Two of the improved spring-supports are provided for each vehicle and they comprise saddles 16 and 16' that have concave under faces adapted to neatly fit upon the casing portions 3 and 4 respectively, one saddle having two pillars 17 and 18 thereon that are integral therewith and spaced apart sufficiently to receive the spring 14 between them, the other saddle having similar pillars 17' and 18' fixed thereon. One saddle has apertured ears 19 and 20 thereon, the remaining saddle having similar ears 19' and 20' thereon. The saddles may be placed upon the axle casing adjacent to the gear casing 5 where the pillars may pass under the spring 14, after which the saddles may be freely moved outward to the collars 6 and 7 respectively with the end portions of the spring 14 between the pillars of the respective saddles. Each saddle has a relatively large portion 21 to clear the collar 6 or 7 and also has a reinforcing rib 22 on its top that extends between the adjacent pillars. Also the saddles preferably have bearing projections 23 and 23' integral therewith respectively that extend beyond the saddles along the casing portions 3 and 4 respectively to serve as stay braces for the pillars and provide ample bearing surface upon the ordinarily thin wall of the axle casing. Two clamp parts 24 and 24' are provided which have concave faces adapted to bear against the under side of the casing portions 3 and 4 respectively, each clamp part having apertured ears 25 and 26 thereon respectively which are secured by means of bolts 27 and 28 to the ears of the saddle that is arranged above the clamp part. Each clamp part has a relatively large portion 29 to receive the end portion of the collars 6 or 7 and has also an external strengthening rib 30 thereon. The clamp parts are provided on the larger portions 29 thereof with ears 31 and 31' respectively to which a truss rod 32 is connected by means of nuts 33 and 33', the truss rod being drawn into contact with the under portion of the gear case 5.

The pillars 17 and 18 have reinforcing ribs 34 and 35 on the outer sides thereof that extend to the ears 19 and 20, the pillars 17' and 18' having similar ribs 34' and 35' thereon respectively. The upper portions of the pillars 17 and 18 have flat spring seat plates 36 and 37 integrally fixed thereon respectively that are supported upon the tops of the adjacent ribs 34 and 35, the pillars 17' and 18' and the adjacent ribs having similar plates 36' and 37' thereon. The two spring-supports are identically alike but are arranged in reverse order on the axle casing. Two semi-elliptic springs 38 and 38', which are identically alike are provided, the middle portion of one spring being seated upon the spring seat plates of one pair of pillars, the remaining spring being seated similarly upon the like plates of the other pair of pillars. The spring seat plates are suitably apertured to receive clips or yokes of familiar construction, two yokes 39 being employed to secure one spring upon its seats, similar yokes or clips 39' being employed to secure the remaining spring in place. Links 40 and 41 are connected to the opposite ends respectively of each spring 38 and 38' and have arms 42 and 43 connected thereto respectively which are secured to the frame 15, the springs augmenting the power of the spring 14 to support the load which may be placed upon the frame.

In practical use the additional springs 38 and 38' not only enable the frame 15 to carry relatively heavier loads than formerly, but tend to prevent excessive tilting of the frame 15 upon the middle portion of the spring 14. By the use of the improved spring-supports and the auxiliary springs, a passenger automobile after having become undesirable from long use for passenger service, may be economically converted into a truck with little expense and its usefulness thus extended.

Having thus described the invention, what is claimed as new is—

1. A spring-support comprising a curved saddle having two spaced-apart spring-supporting pillars integral with the convex side thereof and also a transverse rib integral with the convex side and also with the two pillars, a curved clamp part, and bolts for connecting the clamp part with the saddle.

2. A spring-support comprising a saddle having two pillars integral with the normal upper side thereof in spaced relation, the under side of the saddle being concave, the top of each pillar having a spring-seat plate integral thereon, a curved clamp part, and bolts for connecting the clamp part with the saddle.

3. A spring-support comprising a saddle having two pillars integral with the upper side thereof, the under side of the saddle being concave and having one relatively larger spanning end portion, the opposite end of the saddle having a projection integral with the middle portion thereof, two pillars integral with the saddle, each pillar having a spring-seat plate thereon, a clamp part, and bolts for connecting the clamp part with the saddle.

4. A spring-support comprising a saddle having a concave under side and apertured ears on the opposite sides of the concave portion, two pillars integral with the opposite under side of the saddle, each pillar having a spring-seat plate integral with the top thereof and having also an integral rib extending from said plate to the adjacent one of said ears, a clamp part, and bolts for connecting the clamp part with the ears of the saddle.

5. In a spring-support for motor vehicles, the combination with an axle casing, of a saddle seated upon and extending continuously across the top of the casing, said saddle having two spring-supporting pillars integral therewith in spaced apart relation, and a clamp part arranged beneath the axle casing and connected to said saddle, said clamp part having an ear thereon to receive a truss-rod.

In testimony whereof, I affix my signature in presence of two witnesses.

CLARENCE O. GEST.

Witnesses:
E. T. SILVIUS,
MYRTLE McCOY.